United States Patent
Han

(10) Patent No.: US 12,459,403 B2
(45) Date of Patent: Nov. 4, 2025

(54) APPARATUS AND METHOD FOR CONTROLLING DETECTION OF ANTI-PINCH OF A POWER SEAT IN A VEHICLE

(71) Applicants: HYUNDAI MOTOR COMPANY, Seoul (KR); KIA CORPORATION, Seoul (KR)

(72) Inventor: Seung Su Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 354 days.

(21) Appl. No.: 17/360,909

(22) Filed: Jun. 28, 2021

(65) Prior Publication Data
US 2022/0134909 A1 May 5, 2022

(30) Foreign Application Priority Data
Nov. 2, 2020 (KR) .................. 10-2020-0144697

(51) Int. Cl.
*B60N 2/02* (2006.01)
*B60R 16/03* (2006.01)

(52) U.S. Cl.
CPC ....... *B60N 2/0244* (2013.01); *B60N 2/02246* (2023.08); *B60N 2/0228* (2013.01); *B60R 16/03* (2013.01); *B60N 2/0268* (2023.08)

(58) Field of Classification Search
CPC .. B60N 2/0228; B60N 2/0232; B60N 2/0244; B60N 2/0276; B60N 2/07; B60N 2/22;
(Continued)

(56) References Cited

U.S. PATENT DOCUMENTS 6,297,609 B1 * 10/2001 Takahashi ............ H02H 7/0851
  318/484
6,499,359 B1 * 12/2002 Washeleski .......... G01D 5/2417
  73/862.473
(Continued)

FOREIGN PATENT DOCUMENTS

CN  103216172 A  7/2013
CN  108973791 A  12/2018
(Continued)

OTHER PUBLICATIONS

Office Action cited in corresponding Korean patent application No. 10-2020-0144697; Feb. 28, 2025; 12 pp.
(Continued)

*Primary Examiner* — Naeem Taslim Alam
*Assistant Examiner* — Michael J Herrera
(74) *Attorney, Agent, or Firm* — Lempia Summerfield Katz LLC

(57) ABSTRACT

An apparatus for controlling anti-pinch of a power seat in a vehicle, and a method for the same, include a hall sensor to sense a position to which the power seat moves, a driving motor to drive movement of the power seat, a current sensor to measure a level of a current output from the driving motor, and a controller. The controller is configured to train a reference current level for determining the anti-pinch with respect to each position of the power seat by using the hall sensor and the current sensor, to compare a current value, which is measured with respect to each position of the power seat through the current sensor, with the trained reference current level for determining the anti-pinch, and to determine the anti-pinch.

14 Claims, 7 Drawing Sheets

(58) Field of Classification Search
CPC .. B60N 2/34; B60N 2/995; B60N 2002/0268; B60N 2002/0272; B60R 16/03; B60Y 2400/306; B60Y 2400/3084
See application file for complete search history.

(56) References Cited

U.S. PATENT DOCUMENTS

| | | | |
|---|---|---|---|
| 6,573,677 B2 | 6/2003 | Gerbetz | |
| 9,975,453 B2 | 5/2018 | Lee et al. | |
| 10,730,406 B2 * | 8/2020 | Enderich | G01D 5/142 |
| 2002/0101210 A1 * | 8/2002 | Boisvert | H02H 7/0851 |
| | | | 318/469 |
| 2002/0190680 A1 * | 12/2002 | Gerbetz | H02H 7/0851 |
| | | | 318/445 |
| 2004/0183493 A1 * | 9/2004 | Boisvert | H02H 7/0851 |
| | | | 318/469 |
| 2005/0236881 A1 * | 10/2005 | Suda | B60N 2/3009 |
| | | | 297/378.1 |
| 2008/0079379 A1 * | 4/2008 | Odland | H02P 3/08 |
| | | | 318/469 |
| 2010/0039057 A1 * | 2/2010 | Tsai | H02P 7/2805 |
| | | | 318/434 |
| 2010/0256876 A1 * | 10/2010 | Morawek | H02H 7/0851 |
| | | | 701/49 |
| 2014/0333088 A1 * | 11/2014 | Lang | B60N 2/0232 |
| | | | 296/146.1 |
| 2017/0174102 A1 * | 6/2017 | Lee | B60N 2/0232 |
| 2020/0149340 A1 * | 5/2020 | Aoshima | E05F 15/695 |

FOREIGN PATENT DOCUMENTS

| | | |
|---|---|---|
| JP | 2004533566 A | 11/2004 |
| KR | 20130039104 A | 4/2013 |
| KR | 101753999 B1 | 7/2017 |
| KR | 20200065302 A | 6/2020 |
| KR | 20200065312 A | 6/2020 |

OTHER PUBLICATIONS

Office Action cited in Chinese patent application No. 202110732109.4; Jul. 31, 2025; 30 pp.

* cited by examiner

APPARATUS AND METHOD FOR CONTROLLING DETECTION OF ANTI-PINCH OF A POWER SEAT IN A VEHICLE

CROSS-REFERENCE TO RELATED APPLICATION

This application claims the benefit of and priority to Korean Patent Application No. 10-2020-0144697, filed in the Korean Intellectual Property Office on Nov. 2, 2020, the entire contents of which are incorporated herein by reference.

TECHNICAL FIELD

The present disclosure relates to an apparatus and a method for controlling detecting anti-pinch of a power seat in a vehicle, and more particularly, relates to a technology of detecting objects caught or pinched during the operation of the power seat in the vehicle.

BACKGROUND

In general, a vehicle seat, which is to maintain the seating and the posture of an occupant, is configured to have a seat cushion and a seat back positioned on a seat frame moving along a seat rail.

In addition, a sliding device and a reclining device are provided at a rear portion of the seat frame to maintain a posture suitable for a body shape of the occupant.

Such a power seat device converts electrical energy into kinetic energy, as the occupant operates a lever or a switch with a hand Such a power seat adjusts an inclination angle of the seat back by moving the seat in a forward direction or reverse direction as the sliding and reclining device is operated.

Recently, a power seat (or a memory seat) has been extensively used such that the seat is operated through electric-motion using the switch to provide convenience to the driver.

However, since a conventional power seat device does not have an anti-pinch function, a seat may keep moving without stopping although a body part of an occupant or an article is pinched in a seat sliding section while the seat moves. Accordingly, the body part of the occupant may be injured or the article may be broken.

As illustrated in FIG. 1, although in a conventional power seat device a current output from the driving motor is varied depending on positions of the power seat during the operation of the power seat, a reference current is maintained to a constant value. Accordingly, an erroneous reverse operation may be caused during the normal operation in a section E1 where the difference between the reference current and the output current from the driving motor is smaller, and a pinch may not be detected in a section E2 where the difference between the reference current and the current value of the driving motor is increased. This can thereby cause an injury.

SUMMARY

The present disclosure has been made to solve the above-mentioned problems occurring in the prior art while advantages achieved by the prior art are maintained intact.

An aspect of the present disclosure provides an apparatus and a method for controlling detection of anti-pinch of a power seat in a vehicle. The apparatus and method are capable of selecting a current level value optimized for each seat operating section by previously training the current level value for each seat operating section using a hall sensor, without fixing the current level value used to detect the object that is pinched during the operation of the power seat in the vehicle. The apparatus and method are capable of detecting the object that is pinched using the selected current level value, thereby remarkably improving the anti-pinch function.

In addition, another aspect of the present disclosure provides an apparatus and a method for controlling detection of anti-pinch of a power seat in a vehicle. The apparatus and method are capable of correcting a current level of a driving motor by determining an influence of an external environment (lower temperature or higher voltage) by using a hall sensor and re-correcting a training position when reaching an end point of the driving motor to improve the reliability of current data for each position of the power seat.

The technical problems to be solved by the present disclosure are not limited to the aforementioned problems, and any other technical problems that may be solved but not mentioned herein should be clearly understood from the following description by those having ordinary skill in the art to which the present disclosure pertains.

According to an aspect of the present disclosure, an apparatus for controlling anti-pinch of a power seat in a vehicle is provided. The apparatus may include a hall sensor to sense a position to which the power seat moves, a driving motor to drive movement of the power seat, a current sensor to measure a level of a current output from the driving motor, and a controller. The controller is configured to train a reference current level for determining the anti-pinch with respect to each position of the power seat by using the hall sensor and the current sensor, and to compare a current value, which is measured with respect to each position of the power seat through the current sensor, with the trained reference current level for determining the anti-pinch, in order to determine the anti-pinch.

According to an embodiment, the controller may flexibly calculate the reference current level for determining the anti-pinch with respect to each position of the power seat through a learning algorithm.

According to an embodiment, the apparatus may further include a storage to store data and an algorithm executed by the processor.

According to an embodiment, the controller may measure the level of the output current from the driving motor with respect to an operating direction of the driving motor and each position of the power seat. The controller may input the measured level of the output current into a learning algorithm to output a trained current value.

According to an embodiment, the controller may calculate the reference current level for determining the anti-pinch with respect to each position of the power seat, by adding, to the trained current value, an average value of a measured current value of the driving motor and an average value of a constraining current.

According to an embodiment, the controller may determine whether the trained reference current level for determining the anti-pinch with respect to each position of the power seat is stored in the storage, when receiving an operating signal of the driving motor.

According to an embodiment, the controller may compare the trained current value with a current value which is obtained by measuring the level of the output current from the driving motor.

According to an embodiment, the controller may determine a present state as being a normal state that the anti-pinch does not occur, and normally operate the driving motor, when the trained current value is greater than the current value obtained by measuring the level of the output current from the driving motor.

According to an embodiment, the controller may set opposite end positions of an operating section of the driving motor such that the operating section is narrower than a section that the driving motor actually moves. The controller may determine whether the driving motor reaches one of the opposite end positions when the driving motor is stopped.

According to an embodiment, the controller may determine whether the driving motor reaches the one of the opposite end positions, as a constraining current is generated.

According to an embodiment, the controller may correct an end portion of a section for training as a present position by measuring the current from the driving motor, when the driving motor reaches the one of the opposite end positions.

According to an embodiment, when the trained current value is equal to or less than the current value obtained by measuring the level of the output current from the driving motor, the controller may compare the trained reference current level for determining the anti-pinch with respect to each position of the power seat with the current value obtained by measuring the level of the output current from the driving motor.

According to an embodiment, the controller may determine whether a pulse signal of the hall sensor is normal, when the trained reference level for determining the anti-pinch with respect to each position of the power seat is less than the current value obtained by measuring the level of the output current from the driving motor.

According to an embodiment, when the pulse signal of the hall sensor is normal, the controller may correct the trained reference level for determining the anti-pinch with respect to each position of the power seat to be a higher level.

According to an embodiment, when the pulse signal of the hall sensor is not normal, the controller may determine that pinching is caused, and perform a control operation to stop motion of the power seat and to perform a reverse operation.

According to an aspect of the present disclosure, a method for controlling detection of anti-pinch of a power seat in a vehicle is provided. The method may include: measuring a value of a current output from a driving motor, which drives the power seat, with respect to each position of the power seat; training a reference current level for determining the anti-pinch with respect to each position of the power seat through a learning operation of employing, as an input value, the value of the current output from the driving motor, which is measured with respect to each position of the power seat; and comparing the value of the current output from the driving motor, which is measured with respect to each position of the power seat, with the trained reference current level for determining the anti-pinch such that the anti-pinch is determined.

According to an embodiment, the training of the reference current level for determining the anti-pinch with respect to each position of the power seat may include flexibly calculating the reference current level for determining the anti-pinch with respect to each position of the power seat, through a learning algorithm.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
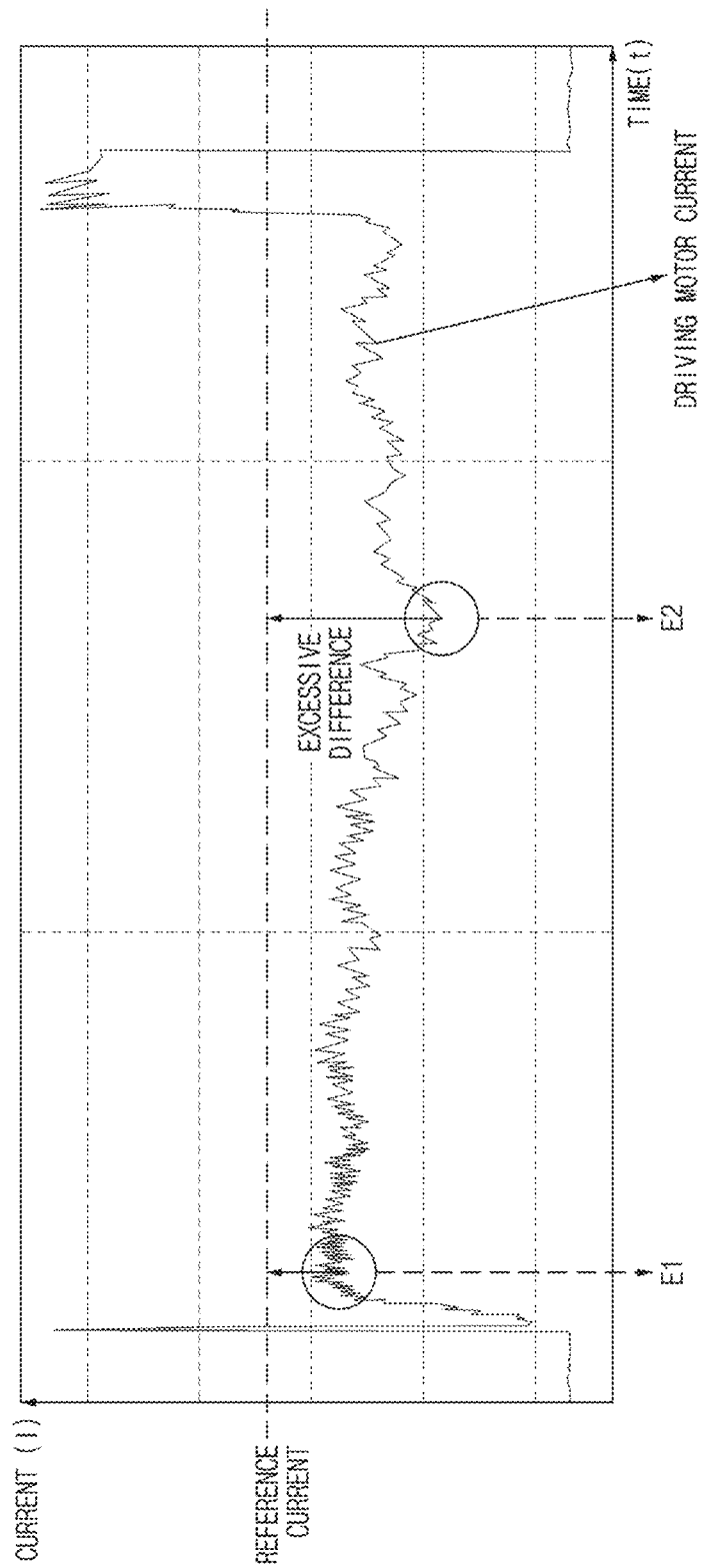
FIG. 1 is a view illustrating the problem of a conventional apparatus for controlling detection of anti-pinch of a power seat in a vehicle.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order to avoid unnecessarily obscuring the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Hereinafter, embodiments of the present disclosure are described in detail with reference to FIGS. 2-7.

Figure 2:
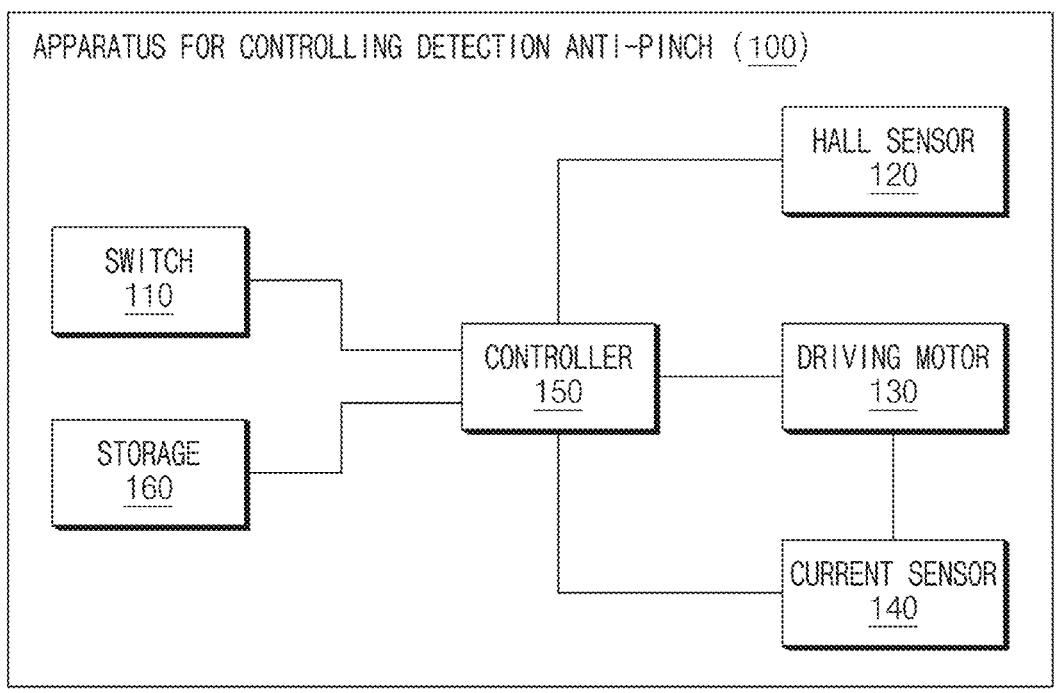
FIG. 2 is a block diagram illustrating the configuration of an apparatus 100 for controlling detection of an anti-pinch of a power seat in a vehicle, according to an embodiment of the present disclosure.

FIG. 2 is a block diagram illustrating the configuration of an apparatus for controlling detection of anti-pinch of a power seat in a vehicle, according to an embodiment of the present disclosure.

Referring to FIG. 2, according to an embodiment of the present disclosure, an apparatus 100 for controlling the detection of anti-pinch of a power seat in a vehicle includes a switch 110, a hall sensor 120, a driving motor 130, a current sensor 140, a controller 150, and a storage 160.

According to an embodiment of the present disclosure, the apparatus 100 for controlling detection of anti-pinch of the power seat in the vehicle may be implemented inside the vehicle. In this case, the apparatus 100 for controlling detection of anti-pinch of the power seat in the vehicle may be formed integrally with the internal control units of the vehicle or may be implemented separately from the internal control units of the vehicle and be connected with the internal control units of the vehicle through a separate connector.

The switch 110 may be operated by a user to automatically adjust a reclining angle of the power seat.

The hall sensor 120, which is a magnetic-electric converter using a Hall effect, may sense the position of the power seat. In other words, the hall sensor 120 may sense a present position (for example, may sense whether the power seat moves forward), by sensing the variation in a magnetic field, which results from the movement of the power seat, and by transmitting an output signal to the controller 150.

The driving motor 130 is driven to recline the backrest angle of the power seat in a forward direction or a reverse direction or may be driven to slide the seat in the forward direction or the reverse direction.

The current sensor 140 senses the level of an output current from the driving motor 130.

The controller 150 may be electrically connected with the switch 110, the hall sensor 120, the driving motor 130, and the current sensor 140, may electrically control each component, and may be an electric circuit that executes software commands. Accordingly, the controller 130 may perform various data processing and calculation, to be described below.

The controller 150 may process signals transmitted between the components. The controller 150 may be, for example, an electronic control unit (ECU), a micro controller unit (MCU), or another lower-level controller mounted in the vehicle.

The controller 150 may train a reference current level (herein, the term "reference current level" may be used interchangeably with the terms "reference current value", "reference current level value", and "reference level") for determining anti-pinch with respect to each position of the power seat by using the hall sensor 120 and the current sensor 140. The controller 150 may compare the level of a current value measured with respect to each position of the power seat and the trained reference current level used for determining the anti-pinch, thereby determining the anti-pinch.

The controller 150 may flexibly calculate the reference current level for determining anti-pinch with respect to each position of the power seat, through a learning algorithm. In this case, the learning algorithm may employ a typical algorithm to generate an output through learning based on input data.

Figure 4:
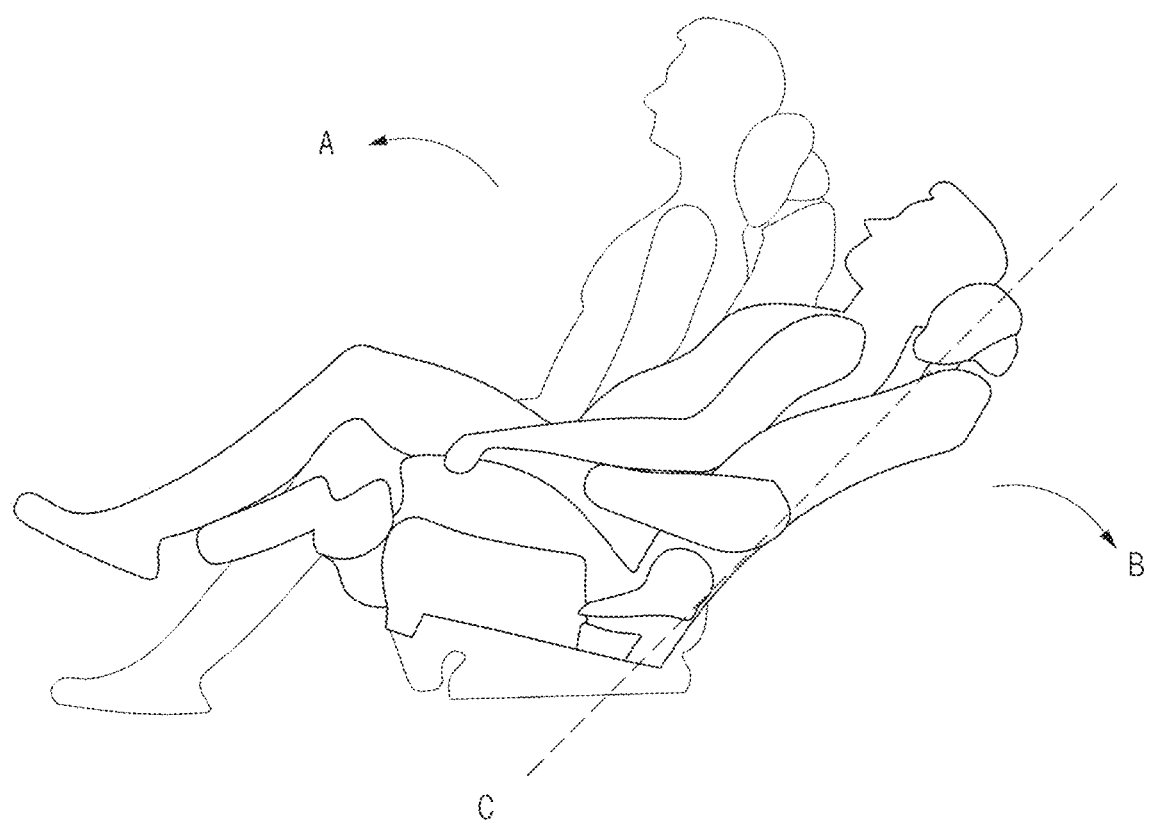
FIG. 4 is a view illustrating a moving direction of the power seat, according to an embodiment of the present disclosure.

The controller 150 may measure a current level (herein, the term "current level" is used interchangeably with a term "current value") output from the driving motor 130 with respect to each operating direction (motor operating direction) of the driving motor 130 and each position of the power seat. The controller 150 may input the measured current level into the learning algorithm such that a trained current value is output. In this case, the operating direction of the driving motor 130 may be a forward direction 'A' or a reverse direction 'B' as illustrated in FIG. 4, and the position of the power seat may be a position (reclining position) 'C' for a reclining angle of the power seat. In this case, the hall sensor 120 may sense the operating direction of the driving motor and the position of the power seat and may provide the sensing result to the controller 150. FIG. 4 is a view illustrating a moving direction of the power seat, according to an embodiment of the present disclosure.

The controller 150 may calculate the reference current level, which is used for determining the anti-pinch, with respect to each position of the power switch, by adding, to the trained current value, a differential value between an average value of measured current values of the driving motor and an average value of constraining currents. The controller 150 may store the reference current value in the storage 160.

That is, the control unit 150 may calculate the reference current level for determining the anti-pinch by subtracting the average value of the restraining current from the average value of the operating current as shown in Equation 1 below.

Reference current level for determining the anti-pinch=trained current value+(average value of operating current−average value of the restraint current)    [equation 1]

When receiving an operating signal of the driving motor 130, the controller 150 may determine whether the trained reference current level, which is used for determining the anti-pinch with respect to each position of the power seat, is stored in the storage 160. When the reference current level is not trained, the controller 150 trains the reference current level. When the reference current level is trained, the controller 150 may determine the anti-pinch using the trained reference current level for determining the anti-pinch with respect to each position of the power seat.

Figure 6:
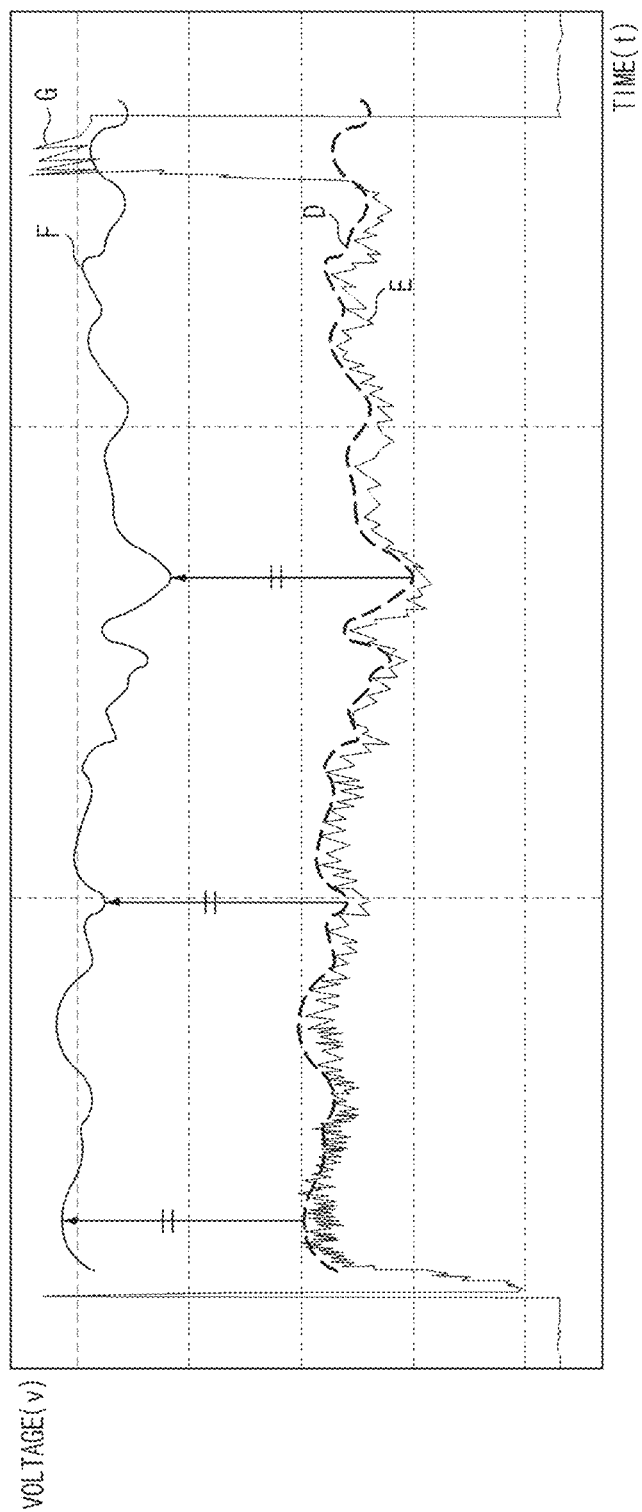
FIG. 6 is a view illustrating a current level for each seat position, according to an embodiment of the present disclosure.

The controller 150 may compare the trained current value with a current value obtained by measuring the level of the output current from the driving motor. When the trained current value is greater than the current value obtained by measuring the level of the output current from the driving motor, the controller 150 may determine a present state as being a normal state. In the normal state, the anti-pinch does not occur and the controller may normally operate the driving motor. FIG. 6 is a view illustrating a current level at each seat position, according to an embodiment of the present disclosure. As illustrated in FIG. 6, a trained current value (level) 'D' may be compared with a current value 'E' obtained by measuring the level of an output current from a driving motor.

The controller 150 sets opposite end positions of an operating section of the driving motor, and specifically, sets the opposite end positions of the operating section of the driving motor such that the operating section is narrower than the section that the driving motor actually moves. When the driving motor is stopped, the controller 150 may determine whether the driving motor reaches one of the opposite end positions. In this case, the opposite end positions of the operating section include an end position when the power seat moves in the forward direction 'A' and an end position when the power seat moves in the reverse direction as illustrated in FIG. 4.

The controller 150 may determine whether the driving motor reaches one of the opposite end positions, as a constraining current is generated. As illustrated in FIG. 6, when the driving motor 130 reaches the opposite end positions, a constraining current 'G' is generated. Accordingly, it may be recognized that the driving motor 130 reaches the opposite end positions.

The controller 150 may correct a training section with respect to each position of the power seat, when the driving motor 130 reaches one of the opposite end positions. In other words, the controller 150 may correct a training position to prevent the driving motor 130 from reaching the opposite end positions and may correct, as positions of the opposite end positions, positions right before the constraining current is generated or positions before 10% of the whole section of a stroke that the driving motor 130 is driven.

When the trained current value (reference current value) is less than the current value obtained by measuring the level of the output current from the driving motor, the controller 150 may compare the trained reference current level F for determining the anti-pinch with respect to each position of the power seat with the current value E obtained by measuring the level of the output current from the driving motor.

Figure 5:
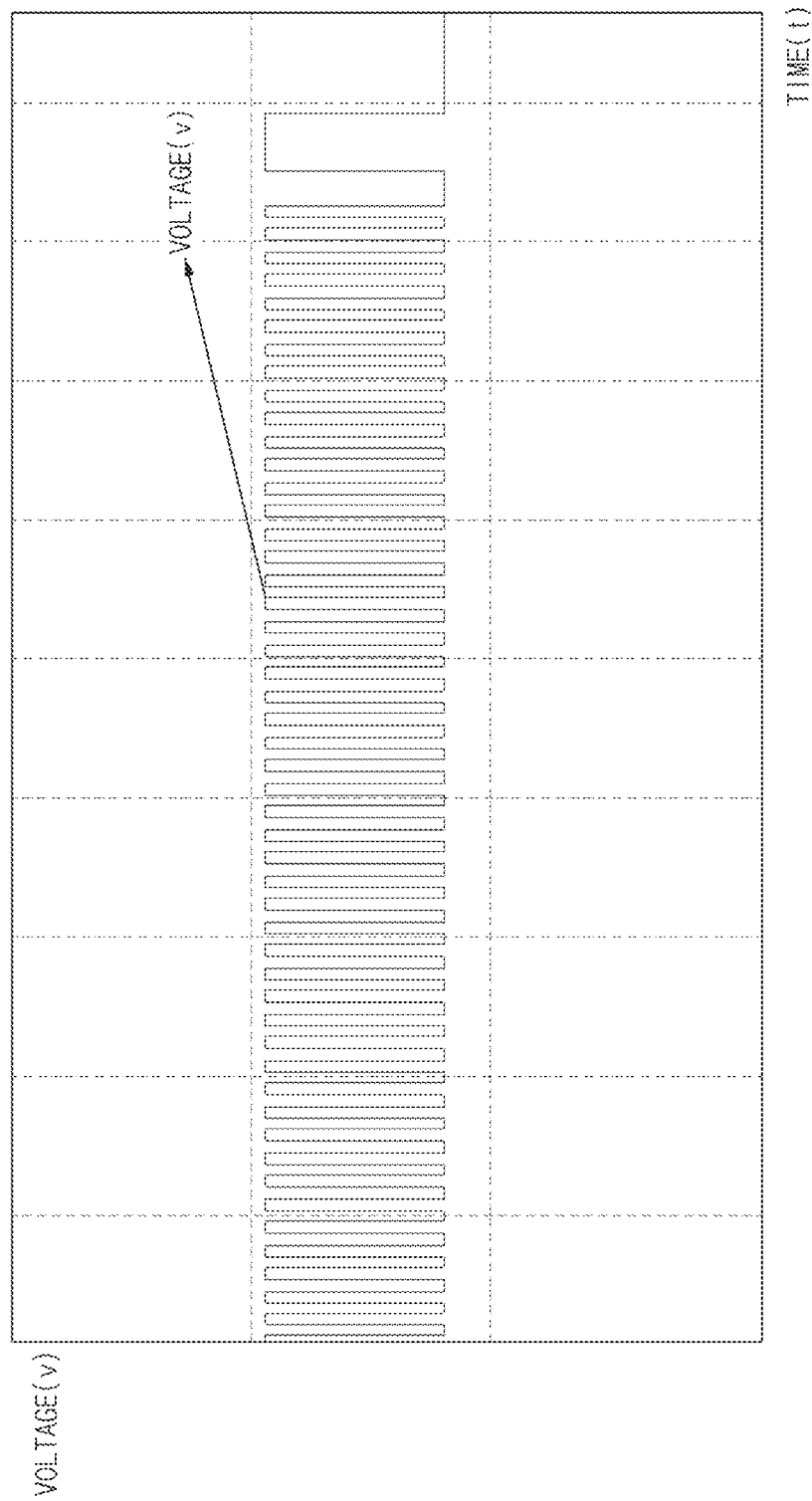
FIG. 5 is a view illustrating an output signal of a hall sensor, according to an embodiment of the present disclosure.

The controller 150 may determine whether a pulse signal of the hall sensor 120 is normal, when the trained reference level for determining the anti-pinch with respect to each position of the power seat is less than the current value obtained by measuring the level of the output current from the driving motor. In this case, the normal pulse signal of the hall sensor 120 is as illustrated in FIG. 5. FIG. 5 is a view illustrating an output signal of a hall sensor, according to an embodiment of the present disclosure.

The controller 150 may correct the trained reference level for determining the anti-pinch with respect to each position of the power seat to be higher, when the pulse signal of the hall sensor 120 is normal. Meanwhile, the controller 150 may determine that an object is pinched when the pulse signal of the hall sensor is not normal and may execute a control operation to stop the movement of the power seat and to perform a reverse operation.

The storage 160 may store data and/or algorithms, for example, a learning algorithm necessary for the controller 150 to operate. In this case, the learning algorithm may be a typical learning algorithm.

For example, the storage 160 may store the value of an output current from the driving motor and the reference current value for determining the anti-pinch, which are trained through the learning algorithm.

In addition, the storage 160 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

Figure 3:
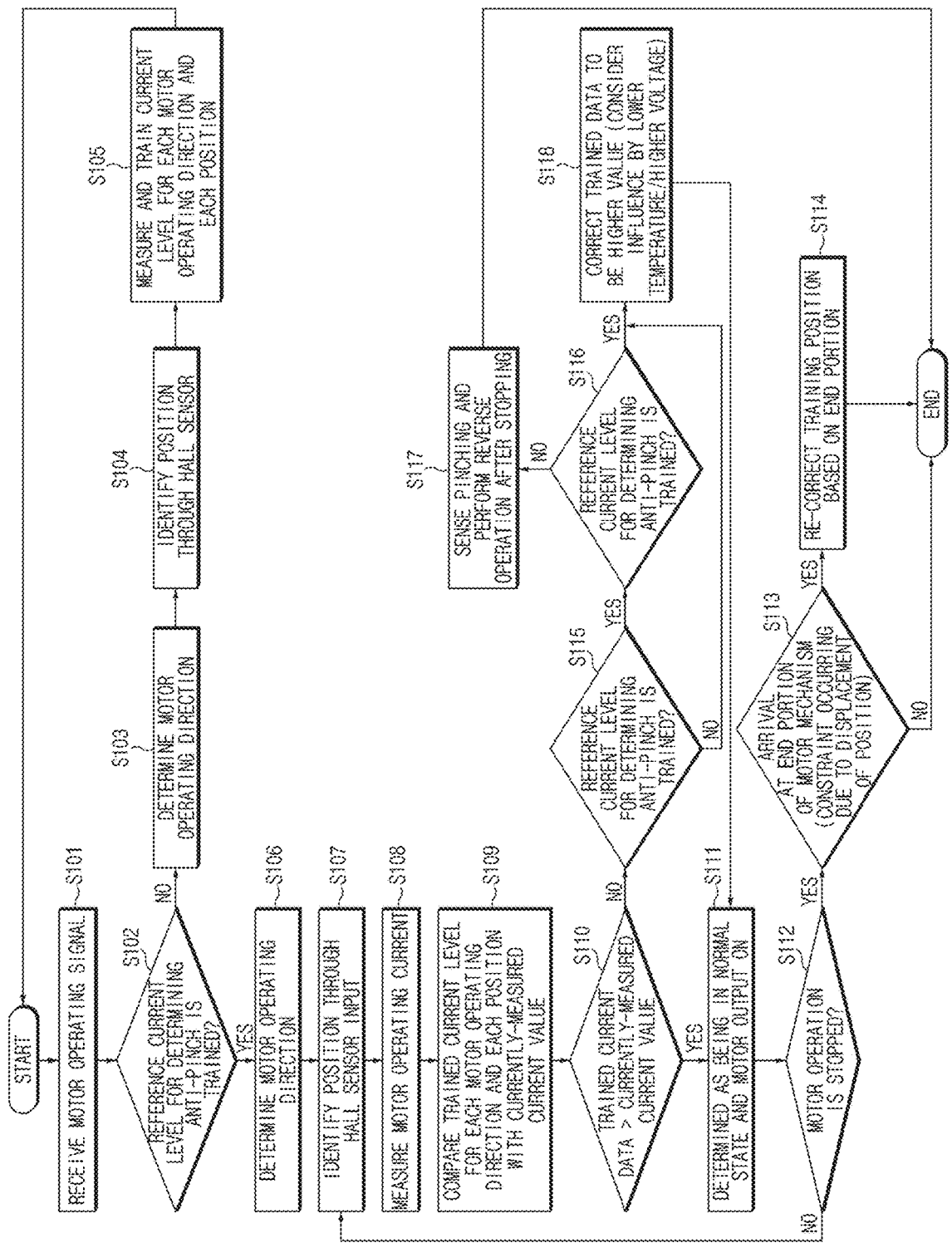
FIG. 3 is a flowchart illustrating a method for controlling detection of anti-pinch of a power seat in a vehicle, according to an embodiment of the present disclosure.

Hereinafter, an apparatus for controlling detection of anti-pinch of a power seat in a vehicle is described in detail with reference to FIG. 3, according to an embodiment of the present disclosure. FIG. 3 is a flowchart illustrating a method for controlling detection of the anti-pinch of a power seat in a vehicle, according to an embodiment of the present disclosure.

Hereinafter, it is assumed that the apparatus 100 for controlling the detection of the anti-pinch of a power seat in the vehicle as illustrated in FIG. 2 performs the process of FIG. 3. In addition, in the following description made with reference to FIG. 3, it may be understood that the operation described as being performed by the apparatus 100 is controlled by the controller 150 of the apparatus 100 for controlling the detection of anti-pinch of the power seat in the vehicle.

Referring to FIG. 3, the apparatus 100 for controlling detection of the anti-pinch of the power seat in the vehicle determines whether the reference current level for determining the anti-pinch is trained (S102), when the operating signal (motor operating signal) of the driving motor is received (S101).

When the reference current level for determining the anti-pinch is not completely trained, the apparatus 100 for controlling the detection of the anti-pinch determines the operating direction (motor operating direction) of the driving motor using the motor operating signal (S103), and identifies a position, to which the power seat is moved, through the hall sensor 120 (S104). In other words, the apparatus 100 for controlling detection of the anti-pinch may determine whether the motor operating direction is the forward direction 'A' or the reverse direction 'B'. In addition, the apparatus 100 for controlling detection of the anti-pinch of the power seat may determine a reclining position 'C'.

The apparatus 100 for controlling detection of the anti-pinch measures the level of a current with respect to each motor operating direction and each seat position and trains the measured level of the current, based on the learning algorithm. In this case, the learning algorithm may include a typical learning algorithm to output an output value through the learning based on the input value. Thereafter, the apparatus 100 for controlling the detection of the anti-pinch stores the result from the learning. In other words, data measured with respect to each motor operating direction and each seat position are input as an input value into the learning algorithm such that the trained current level value is obtained.

Thereafter, the apparatus 100 for controlling the detection of the anti-pinch calculates a reference current level value 'F' for determining the anti-pinch based on the motor operating direction and the seat position as illustrated in FIG. 6. In other words, the reference current level value 'F' has the sum of a trained current level (value) 'D' for each position of the power seat and a constant current value. In this case, the constant current value is the differential value between the average value of operating currents (motor operating currents) of the driving motor and the average value of containing currents, with respect to each position of the power seat. As described above, the reference current level for determining the anti-pinch is trained with respect to each operating direction of the driving motor, which drives the power seat and each reclining position of the power seat to constantly maintain the difference between the reference current level 'F' for determining the anti-pinch and the measured current level 'E' of the driving motor as illustrated in FIG. 6 This thereby prevents a reverse operation due to excessive pinching power or the erroneous operation during the normal operation.

Meanwhile, when the training is completed in S102, the apparatus 100 for controlling the detection of the anti-pinch of the power seat determines the motor operating direction (S106) and identifies the position of the power seat through a hall sensor input (S107).

The apparatus 100 for controlling detection of anti-pinch of the power seat in vehicle measures the operating current (motor operating current) of the driving motor (S108) and compares the trained current data (trained current value) for each motor operating direction and each sensor position with a currently-measured current value (S109).

The apparatus 100 for controlling detection of anti-pinch of the power seat determines whether the trained current data (trained reference current value) is greater than the currently-measured current value (S110).

The apparatus 100 for controlling detection of anti-pinch of the power seat determines the driving motor as being in a normal state having no pinch and turns on the output of the driving motor (S111), when the trained current data is greater than the currently-measured current value.

The apparatus 100 for controlling detection of anti-pinch of the power seat determines whether to stop the operation of the driving motor (S112) and repeats S107 to S112 when the operation of the driving motor is not stopped.

When the operation of the driving motor is stopped, the apparatus 100 for controlling detection of anti-pinch of the power seat determines whether the motor (the driving motor) arrives at an end portion of a motor mechanism (S113). The apparatus 100 for controlling detection of anti-pinch of the power seat re-correct a training position based on the end portion (S114), when the motor arrives at the end portion of the motor mechanism. In general, a specific end position is arbitrarily set such that the motor stops before a specific section of the motor mechanism, thereby preventing the motor from physically arriving at the end portion of the motor mechanism. Since the seat is reclined in the front-rear direction, motor end positions when the power seat moves forward and backward are set. When the driving motor 130 arrives at the end position, an error may occur, and a constraining current may be generated (See 'G' of FIG. 6).

Accordingly, when the driving motor 130 arrives at an end position, an error may be neglected and a present position is updated as an end point of a training section, and an opposite end point may be identically updated. In addition, points corresponding to 10% of the whole section of a stroke distance that the driving motor 130 moves may be set as the end points of the training section.

Meanwhile, when the trained current data is equal to or less than measured data in S110, the apparatus 100 for controlling the detection the anti-pinch determines whether a trained reference current for determining the anti-pinch is less than the measured data (S115).

The apparatus 100 for controlling the detection the anti-pinch determines whether a hall sensor pulse is normally input (S116) when the trained reference current for determining the anti-pinch is less than the measured data, senses pinching as being caused when the hall sensor pulse is not normal, and performs a reverse operation after stopping the driving motor 130 (S117). In this case, the pulse signal of the hall sensor has a constant value as illustrated in FIG. 5.

The apparatus 100 for controlling the detection the anti-pinch determines a current level as being changed due to an external environment (a higher voltage or a lower temperature) and corrects the trained current data to be a higher value, when the pulse signal of the hall sensor is normal, in the state that the trained current data is less than or equal to the measured data, and the trained reference current for determining the anti-pinch is less than the measured data (S118).

As described above, according to the present disclosure, the reference current level for determining the anti-pinch of the power seat is flexibly set, through the learning algorithm, with respect to the direction of the power seat and the position of the power seat. Thus, the difference between the reference current level for determining the anti-pinch of the power seat and the measured current is maintained to be constant, thereby preventing excessive pinching power or the error during the normal operation.

Figure 7:
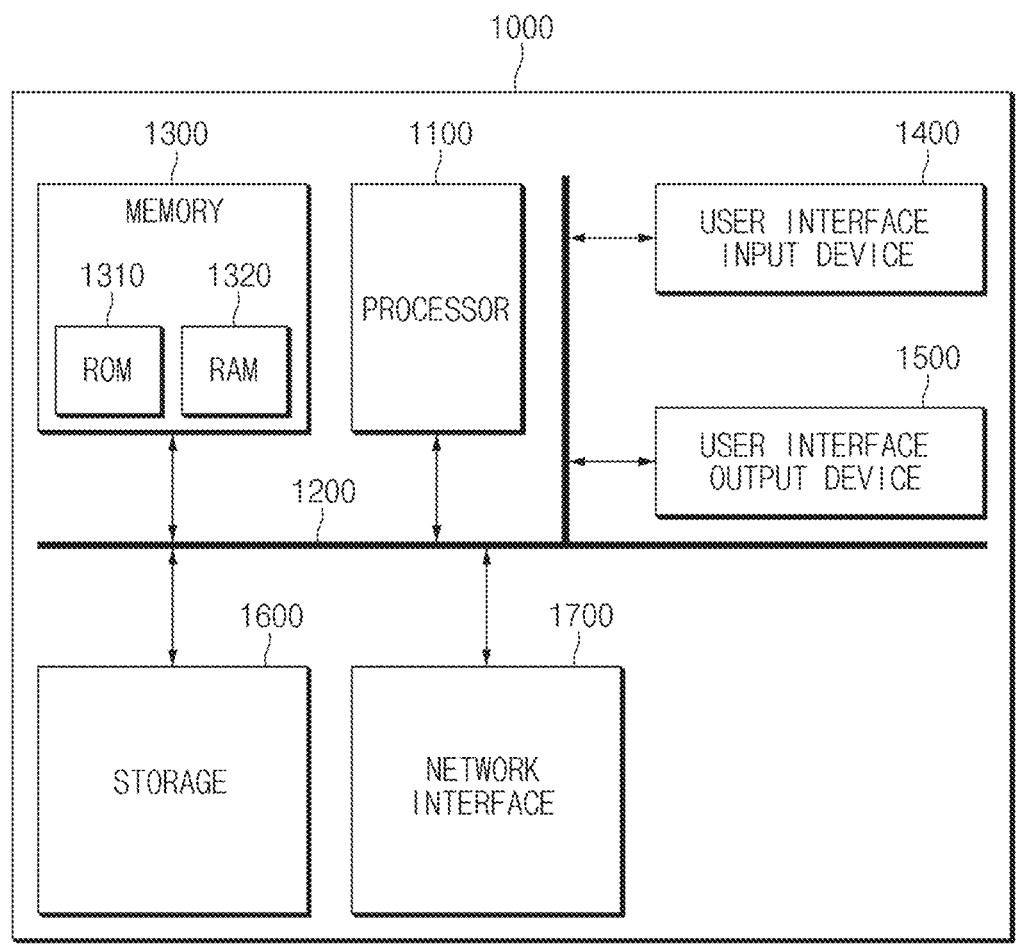
FIG. 7 illustrates a computing system, according to an embodiment of the present disclosure.

FIG. 7 illustrates a computing system, according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to embodiments and the accompanying drawings, the present disclosure is not limited thereto. The disclosed embodiments and the disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but are provided only for the illustrative purpose. The scope of protection of the present disclosure should be construed by the attached claims, and all equivalents thereof should be construed as being included within the scope of the present disclosure.

As described above, according to the present disclosure, the current level value optimized for each seat operating section may be selected by previously training the current level value for each seat operating section using a hall sensor without fixing the current level value used to detect the object pinched during the operation of the power seat in the vehicle, and the object pinched may be detected using the selected current level value, thereby remarkably improving the anti-pinch function.

Additionally, a variety of effects directly or indirectly understood through the disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An apparatus for controlling anti-pinch of a power seat in a vehicle, the apparatus comprising:
   a hall sensor configured to sense a position to which the power seat moves;
   a driving motor configured to drive movement of the power seat;
   a current sensor configured to measure a level of a current output from the driving motor;
   a controller; and
   a storage configured to store data and an algorithm executed by the controller, wherein the controller is configured to
train a reference current level for determining the anti-pinch with respect to each position of the power seat by using the hall sensor and the current sensor,
compare a current value, which is measured with respect to each position of the power seat through the current sensor, with the trained reference current level for determining the anti-pinch, such that the anti-pinch is determined,
determine whether the trained reference current level for determining the anti-pinch with respect to each position of the power seat is stored in the storage, when receiving an operating signal of the driving motor,
set opposite end positions of an operating section of the driving motor such that the operating section is narrower than a section that the driving motor moves,
determine whether the driving motor reaches one of the opposite end positions, as a constraining current is generated,
correct a training section with respect to each position of the power seat when the driving motor reaches one of the opposite end positions,
when the reference current level for determining the anti-pinch with respect to each position of the power seat is lower than the measured current value, and a pulse signal of the hall sensor is normal, correct the reference current level for determining the anti-pinch with respect to each position of the power seat to be a higher level, and control a difference between the reference current for determining the anti-pinch with respect to each position of the power seat and the measured current value to be constant,
calculate a difference value between an average value of a measured current value of the driving motor, which is an average value of the driving current, and an average value of a constraining current that occurs when the driving motor reaches both end points of the power seats, and
determine the reference current level by adding the difference value to the trained current value,
wherein the storage is configured to store the trained reference current level for determining the anti-pinch with respect to each position of the power seat.

2. The apparatus of claim 1, wherein the controller is configured to:
flexibly calculate the reference current level for determining the anti-pinch with respect to each position of the power seat, through a learning algorithm.

3. The apparatus of claim 1, wherein the controller is configured to:
measure the level of the output current from the driving motor with respect to an operating direction of the driving motor and each position of the power seat; and
input the measured level of the output current into a learning algorithm to output a trained current value.

4. The apparatus of claim 3, wherein the controller is configured to:
compare the trained current value with a current value which is obtained by measuring the level of the output current from the driving motor.

5. The apparatus of claim 4, wherein the controller is configured to:
determine a present state as being a normal state that the anti-pinch does not occur; and
normally operate the driving motor, when the trained current value is greater than the current value obtained by measuring the level of the output current from the driving motor.

6. The apparatus of claim 4, wherein the controller is configured to:
compare the trained reference current level with the current value obtained by measuring the level of the output current from the driving motor, when the trained current value is equal to or less than the current value obtained by measuring the level of the output current from the driving motor.

7. The apparatus of claim 6, wherein the controller is configured to:
determine whether a pulse signal of the hall sensor is normal, when the trained reference level for determining the anti-pinch with respect to each position of the power seat is less than the current value obtained by measuring the level of the output current from the driving motor.

8. The apparatus of claim 7, wherein the controller is configured to:
determine that pinching is caused; and
perform a control operation to stop motion of the power seat and to perform a reverse operation, when the pulse signal of the hall sensor is not normal.

9. The apparatus of claim 1, wherein the controller is configured to:
determine whether the driving motor reaches one of the opposite end positions when the driving motor is stopped.

10. The apparatus of claim 9, wherein the controller is configured to:
correct an end portion of a section for training as a present position by measuring the current from the driving motor when the driving motor reaches the one of the opposite end positions.

11. The apparatus of claim 1, wherein the controller is configured to:
determine the current value obtained by measuring the level of the output current from the driving motor as being changed due to an external environment and correct the trained reference current level to be a higher valve when the trained reference current level is equal to or less than the measured level of output current from the driving motor and a pulse signal of the hall sensor is normal.

12. A method for controlling detection of anti-pinch of a power seat in a vehicle, the method comprising:
measuring a value of a current output from a driving motor, which drives the power seat, with respect to each position of the power seat;
training a reference current level for determining the anti-pinch with respect to each position of the power seat through a learning operation of employing, as an input value, the value of the current output from the driving motor, which is measured with respect to each position of the power seat;
storing the trained reference current level for determining the anti-pinch with respect to each position of the power seat;
comparing the value of the current output from the driving motor, which is measured with respect to each position of the power seat, with the trained reference current level for determining the anti-pinch such that the anti-pinch is determined;

determining whether the trained reference current level for determining the anti-pinch with respect to each position of the seat is stored in a storage, when receiving an operating signal of the drive motor;

setting opposite end positions of an operating section of the driving motor such that the operating section is narrower than a section that the driving motor moves;

determining whether the driving motor reaches one of the opposite end positions, as a constraining current is generated;

correcting a training section with respect to each position of the power seat when the driving motor reaches one of the opposite end positions; calculating a difference value between an average vale of a measured current value of the driving motor, which is an average value of the driving current, and an average value of a constraining current that occurs when the driving motor reaches both end points of the power seat; and determining the reference current level by adding the difference value to the trained current valve, when the reference current level for determining the anti-pinch with respect to each position of the power seat is lower than the measured current value and a pulse signal of the hall sensor is normal, correcting the reference current level for determining the anti-pinch with respect to each position of the power seat to be a higher level, and controlling a difference between the reference current for determining the anti-pinch with respect to each position of the power seat and the measured current value to be constant.

13. The method of claim 12, wherein the training of the reference current level for determining the anti-pinch with respect to each position of the power seat includes:

flexibly calculating the reference current level for determining the anti-pinch with respect to each position of the power seat, through a learning algorithm.

14. The method of claim 12, further comprising:

determining the current value obtained by measuring the value of the current output from the driving motor as being changed due to an external environment and correcting the trained reference current level to be a higher value when the trained reference current level is equal to or less than the measured level of output current from the driving motor and a pulse signal of a hall sensor is normal.

* * * * *